US007441275B2

United States Patent
McCallam et al.

(10) Patent No.: US 7,441,275 B2
(45) Date of Patent: Oct. 21, 2008

(54) REAL-TIME RECOVERY OF COMPROMISED INFORMATION

(75) Inventors: Dennis Hain McCallam, Reisterstown, MD (US); Ronald Kenneth Newland, Sun City, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 770 days.

(21) Appl. No.: 10/437,048

(22) Filed: May 14, 2003

(65) Prior Publication Data

US 2004/0230833 A1 Nov. 18, 2004

(51) Int. Cl.
 *G06F 11/00* (2006.01)
 *G06F 12/16* (2006.01)
(52) U.S. Cl. .................... 726/25; 726/23; 707/200; 707/202; 707/204
(58) Field of Classification Search ................ 713/193; 726/3, 22, 23, 25; 707/200, 202, 204
See application file for complete search history.

(56) References Cited

U.S. PATENT DOCUMENTS

| | | | |
|---|---|---|---|
| 6,252,963 B1 | 6/2001 | Rhoads | |
| 6,301,360 B1 | 10/2001 | Bocionek et al. | |
| 6,314,192 B1 | 11/2001 | Chen et al. | |
| 6,324,654 B1 * | 11/2001 | Wahl et al. | 707/204 |
| 6,449,618 B1 * | 9/2002 | Blott et al. | 707/101 |
| 6,754,827 B1 * | 6/2004 | Cane et al. | 713/193 |
| 6,757,698 B2 * | 6/2004 | McBride et al. | 709/248 |
| 6,804,778 B1 * | 10/2004 | Levi et al. | 713/176 |
| 6,839,850 B1 * | 1/2005 | Campbell et al. | 726/23 |
| 2004/0139128 A1 * | 7/2004 | Becker et al. | 707/204 |

OTHER PUBLICATIONS

US 7,130,869, 10/2006, Therrien et al. (withdrawn)*

* cited by examiner

Primary Examiner—Benjamin E. Lanier
Assistant Examiner—Abdulhakim Nobahar
(74) Attorney, Agent, or Firm—Andrews Kurth LLP

(57) ABSTRACT

An apparatus and a corresponding method provide for real-time recovery of compromised information in a computer network. The method includes analyzing data objects in the computer network to determine data objects that comprise minimal essential information, collecting the minimal essential information, and storing the minimal essential information. To limit potential exposure of the minimal essential information, the stored minimal essential information is hidden in the computer network.

19 Claims, 16 Drawing Sheets

| | DATA OBJECT | CREATION (289) | TIME OF CREATION (290) | ORIGIN (291) | VARIABLE (292) | REFRESH RATE (293) | VALUE (294) | THRESHOLD (295) | MINIMAL ESSENTIAL (296) |
|---|---|---|---|---|---|---|---|---|---|
| 270 | RANGE | ORIGINAL | OPERATION | SELF | Y | ONCE PER SCAN | $xe-xt$ | $x/2$ | YES, TWO MOST RECENT |
| 272 | BEARING | ORIGINAL | OPERATION | SELF | Y | ONCE PER SCAN | $ye-yt$ | $y/2$ | YES, TWO MOST RECENT |
| 274 | TARGET POSITION | ORIGINAL | OPERATION | SELF | VARIABLE | ONCE PER SCAN | $pe-pt$ | NA | NO |
| 276 | SPEED | COMPUTED | OPERATION | SELF | Y | ONCE PER SCAN | $ne-nt$ | NA | NO |
| 278 | DIRECTION OF MOTION | COMPUTED | OPERATION | SELF | Y | ONCE PER SCAN | $me-mt$ | NA | NO |
| 280 | ACCELERATION | COMPUTED | OPERATION | SELF | Y | ONCE PER SCAN | $qe-qt$ | NA | NO |
| 282 | π | ORIGINAL | INITIATION | SELF | N | NA | 1 | NA | NO |
| 284 | RAIN | NOT APPLICABLE (NA) | OPERATION | EXTERNAL | Y | AS REQUIRED | 1 | NA | NO |
| 286 | CLASSIFICATION | COMPUTED | OPERATION | SELF | Y | WHEN CHANGED | 1 | FRIEND/UNK | YES, IF FOE |

FIG. 4A

REAL-TIME RECOVERY OF COMPROMISED INFORMATION

TECHNICAL FIELD

The technical field is systems and processes designed to protect the security of computer information, and restore access to compromised information.

BACKGROUND

A personal computer and a modem access to the Internet are all the tools that a computer hacker needs to conduct a cyber attack on a computer system. The rapid growth of a computer-literate population provides millions of people the opportunity to possess the skills necessary to conduct a cyber attack. The computer literate population includes recreational hackers who attempt to gain unauthorized electronic access to information and communication systems. These computer hackers are often motivated only by personal fascination with hacking as an interesting game. Criminals, and perhaps organized crime, might also attempt personal financial gain through manipulation of financial or credit accounts or stealing services. Industrial espionage can also be the reason for a cyber attack on a competitor's computer system. Terrorists may attempt to use the computer infrastructure. Other countries may use the computer infrastructure for national intelligence purpose. Finally, there is the prospect of information warfare, which is a broad, orchestrated attempt to disrupt a United States military operation, critical infrastructure(s), or significant economic activity.

A typical secure computer network has an interface for receiving and transmitting data between the secure network and computers outside the secure network. The interface may be a modem or an Internet Protocol (IP) router. Data received by the modem passes through a firewall, which is a network security device that only allows data packets from a trusted computer to be routed to specific addresses within the secure computer network. Although the typical firewall is adequate to prevent outsiders from accessing a secure network, hackers and others can often breach a firewall. An entry by an unauthorized user into the secure computer network, past the firewall, from outside the secure computer network is an intrusion. As can be appreciated, new ways of overcoming the security devices are developed every day.

Another type of unauthorized operation is insider misuse, which is an unauthorized access from a computer within the secure computer network. In insider misuse, the firewall is not breached. Instead, the unauthorized operation occurs from inside the secure computer network. For example, an unauthorized user could obtain the password of all authorized user, logon to the secure computer network from the authorized user's computer, and attempt to perform operations not typically associated with the authorized user.

Security and intrusion detection systems exist that can determine if very specific and well known types of breaches of computer security are occurring. These computer security systems passively collect audit information from network devices and format those audits for later review. Known attack signatures can be identified, but new attacks cause these systems significant problems since the identification of a new attack often needs to have human intervention and assistance. Furthermore these computer security systems do not take steps to stop the misuse or intrusion after it is detected. Security systems that do take active steps are limited to logging a user off the network, stopping communications with that computer, halting operations and shutting down and restarting the computer system, and notifying security personnel of the breach, often by e-mail message.

Once an intruder gains access to information on the secure computer network, the intruder can compromise information on the network such that an extensive recovery process will be required if all the compromised information is to be recovered. For example, if the secure computer network is subjected to an information warfare (IW) attack, then restoration of the secure computer network to full operational capability may involve shutdown of the secure computer network, and a time-consuming restart. Intruders may be able to take advantage of the down-time associated with recovery by physically attacking assets associated with the secure computer network. Existing computer security systems are not capable of rapidly returning a compromised secure computer network to even a minimal level of operation, let alone to full operational capability.

SUMMARY

What is disclosed is method for real-time recovery of compromised information in a computer network. The computer network includes nodes arranged into subnets, with the subnets forming the computer network. The method includes the steps of analyzing data objects in the computer network to determine data objects that comprise minimal essential information, collecting the minimal essential information, and storing the minimal essential information, wherein the stored minimal essential information is hidden in the computer network.

In another aspect, what is disclosed is method for recovering a computer network following an information warfare attack, including, prior to the attack, determining minimal essential information to establish operation of the computer network following the attack, collecting the minimal essential information, and hiding the minimal essential information in the computer network to lessen susceptibility of the minimal essential information to the attack.

In yet another aspect, what is disclosed is a system for recovery of a computer network subject to an information warfare attack. The system includes an agent manager that identifies data objects existing on the computer network, a service manager that determines data objects that are constants, and an application manager that determines a hierarchy of modes of operation of the computer network. Also included are a data analyzer that determines minimal essential information based on the identified data objects, and a recovery manager that collects and stores the minimal essential information, and that uses the minimal essential information to recovery the computer network subsequent to the information warfare attack.

DESCRIPTION OF THE DRAWINGS

The detailed description will refer to the following drawings, in which like numerals refer to like objects, and in which:

FIGS. 4A and 4B illustrate the concept of minimal essential information for use in the network of FIG. 1;

DETAILED DESCRIPTION

Figure 1:
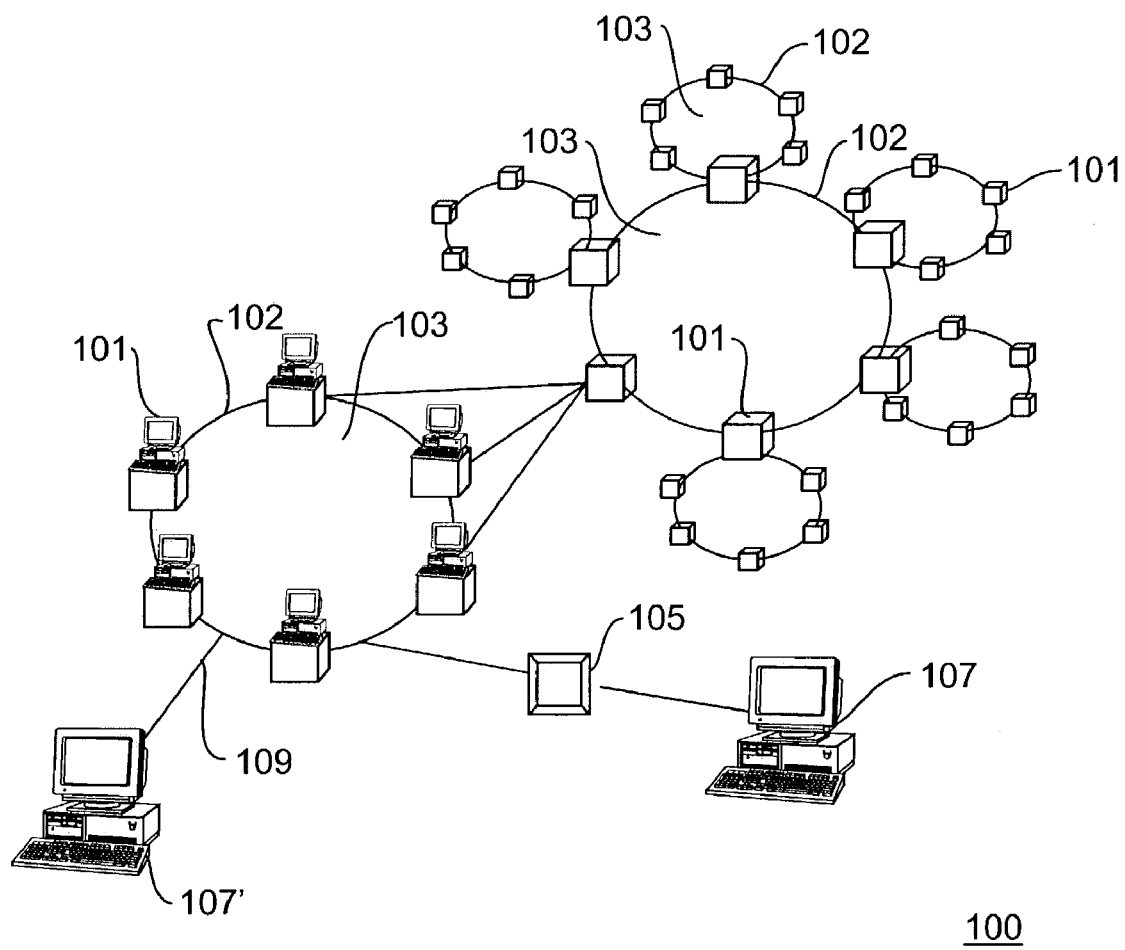
FIG. 1 illustrates a distributed computer network that embodies the concepts of real-time recovery of compromised information.

Many distributed computer system networks are subject to an information warfare (IW) attack and compromise of information. FIG. 1 illustrates a network, configured as a local area network (LAN) 100, which may be subject to IW attack. The LAN 100 includes multiple network devices 101, which are located at nodes on the network 100. The devices 101 are linked by links 102 into subnets 103, and a series of the subnets 103 forms the LAN 100. The devices 101 may be local client processors, such as servers and personal computers, for example. The network 100 may be an ARCnet, an Ethernet, and a Token-Ring network. The links 102 in the network 100 may be of any known physical configuration including unshielded twisted pair (UTP) wire, coaxial cable, shielded twisted pair wire, fiber optic cable, for example. Alternatively, the links 103 may be wireless links. The LAN 100 may also include dial-up remote access using a modem 105 to a remote client 107, and a dedicated port 109 to a remote client 107'.

Figure 2A:
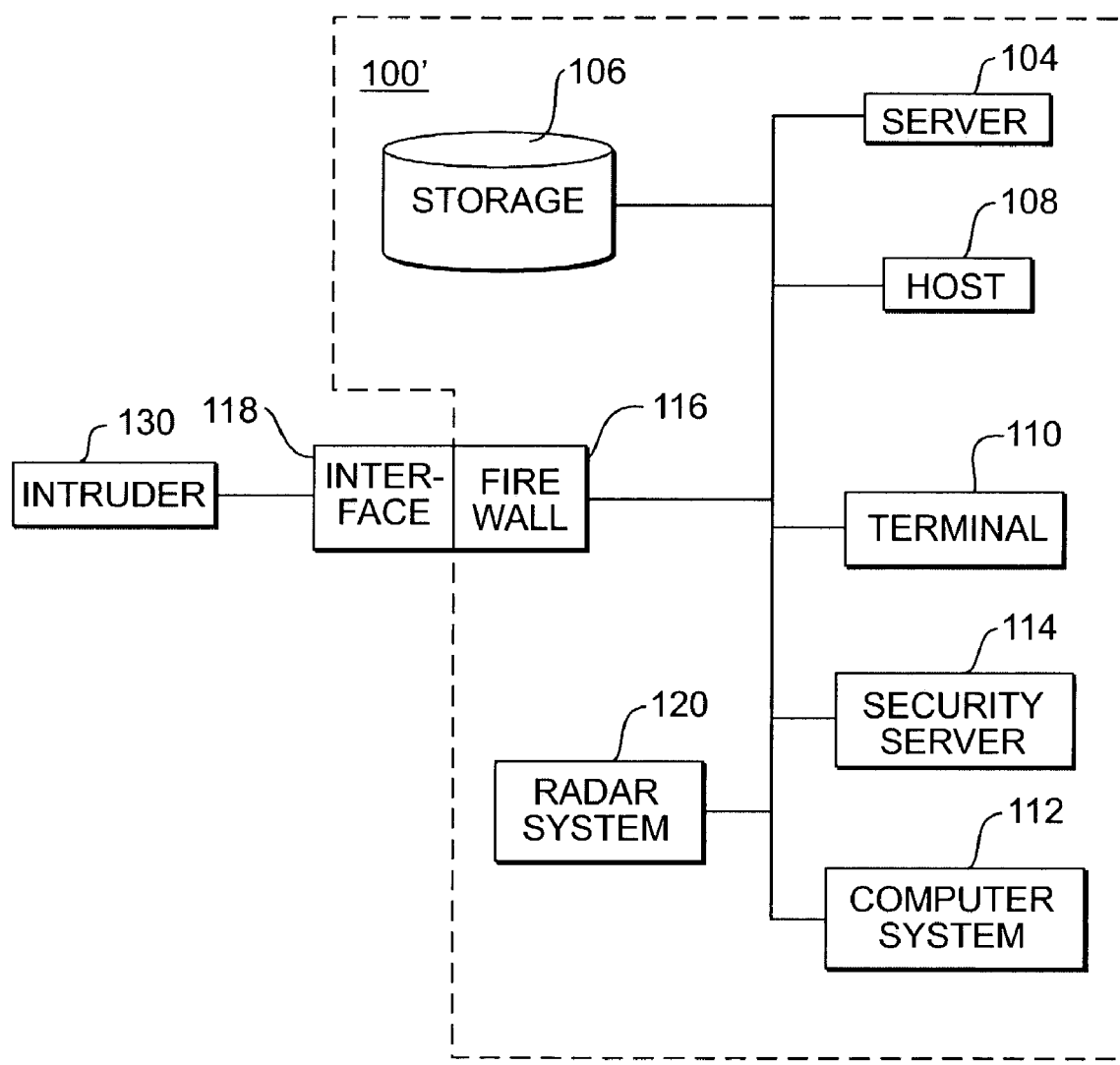
FIG. 2A is a diagram of a portion of the network of FIG. 1.

FIG. 2A is a diagram of a portion 100' of the LAN 100 showing specific features related to security and recovery of compromised information. The LAN portion 100' includes, as network devices 101, a network database server 104, a database 106, a host computer 108, a terminal 110, and a computer system 112. Each network device 104, 106, 108, 110, 112 can also be considered a node because each network device has an addressable interface on the LAN 100. As can be appreciated, many other devices can be coupled to the LAN 100 including personal computers, servers, mini-mainframe computers, mainframe computers, and other devices not illustrated or described, but which are well known in the art.

Also shown is security server 114 for implementing intrusion detection, suppression, coutermeasures, and recovery from IW attack. A firewall 116 connects the LAN portion 100' to an interface 118. The firewall 116 is a combination hardware and software buffer that is between the LAN portion 100' and external devices outside the LAN portion 100'. The network devices 101 within the LAN portion 100' appear within the dashed lines in FIG. 2A, and external devices outside the LAN portion 100' appear outside the dashed lines in FIG. 2A. The firewall 116 allows only specific kinds of messages from external devices to flow in and out of the LAN portion 100'. As is known in the art, firewalls are used to protect networks such as the LAN 100 from intruders or hackers who might try to break into the LAN 100. The interface 118 is external to the LAN 100 and can be a modem or an Internet Protocol (IP) router, for example. The interface 118 serves to connect the LAN 100 to devices outside the LAN 100. For illustrative purposes, an intruder computer system is shown at 130.

Finally, FIG. 2A shows a radar system 120 that may be used to track airborne targets. The radar system 120 includes means for detecting targets, means for displaying target information to a human operator, and means for tracking, analyzing, and classifying targets. These means may include means for alerting human operators when a threat target is detected and classified, as well as means for initiating defensive measures, such as initializing air defense systems (not shown).

Figure 2B:
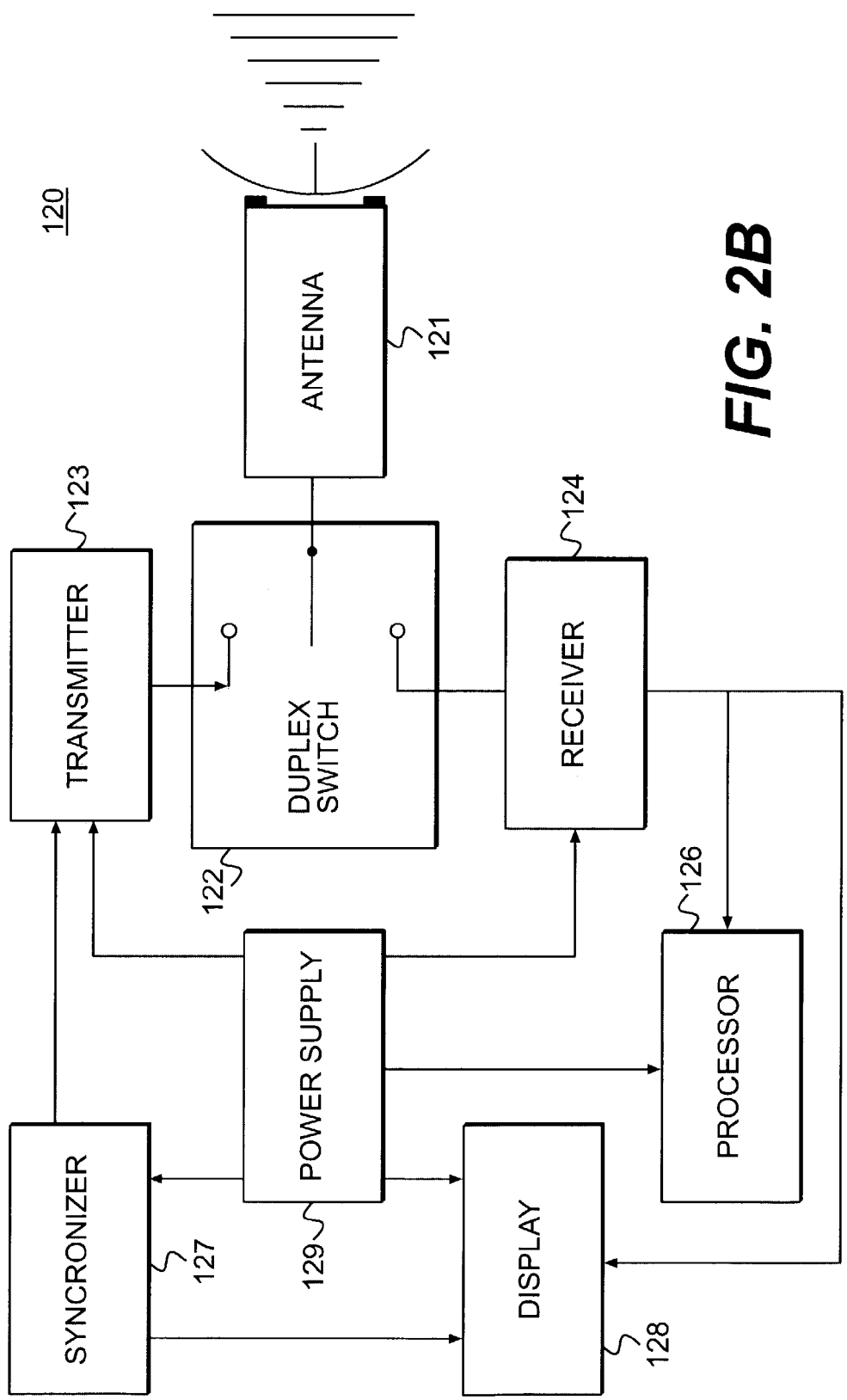
FIG. 2B is a block diagram of a radar system used with the network portion of FIG. 2A.

FIG. 2B is a simplified block diagram of the radar system 120. The radar system 120 includes an antenna 121, a transmitter 123, and a receiver 124, with the transmitter 123 and the receiver 124 coupled to the antenna 121 by a duplex switch 122. The radar system 120 also includes a processor 126 that receives data from the receiver 124, a synchronizer 127 that controls transmissions, and a display 128 that displays information related to transmissions and target detections. Finally, a power supply 129 provides power to components of the radar system 120.

The antenna 121 takes a radar pulse from the transmitter 123 and puts the pulse into the air. Besides focusing the energy of the radar pulse into a well-defines beam, the antenna 121 must keep track of its own orientation, which can be accomplished by the synchronizer 127. In some radar systems, the antenna does not actually move, but the radar pulse is steered electronically, in which case the orientation of the radar beam is known a priori.

The transmitter 123 creates radio waves, and modulates the radio waves to form the radar pulse. The transmitter 123 also amplifies the signal to a high power to provide for an adequate detection range. The receiver 124 receives a return signal from a target. The receiver's ability to discern a received signal from a target from background depends on signal to noise ratio (S/N, or SNR). In the receiver 124, the SNR sets a threshold for detection that determines what will be displayed, and what will not be displayed. If the SNR is set too high, then the radar system 120 will experience few false alarms, but some actual targets may not be displayed. The receiver 124 may monitor background noise and adjust the SNR to maintain a constant false alarm rate. The receiver 124 includes several other parameter that determine performance of the radar system 120. One such parameter is fast time constant (FTC). FTC is intended to reduce the effect of long duration events such as rain, for example. Since rain occurs over an extended area, rain will produce a long, steady return. The FTC allows only return signals with a rapid rise and fall to be displayed.

The display 128 may be designed to provide visual information to a human operator. The most common display format is a plan position indicator (PPI) display, which is a circular, top down view of the area swept out by the radar system 120, with the antenna 121 at the center of the display. On the PPI display, target range is represented by the distance from the center of the display outward, and bearing is indicated by angular displacement from a reference point (usually "noon").

Figure 3:
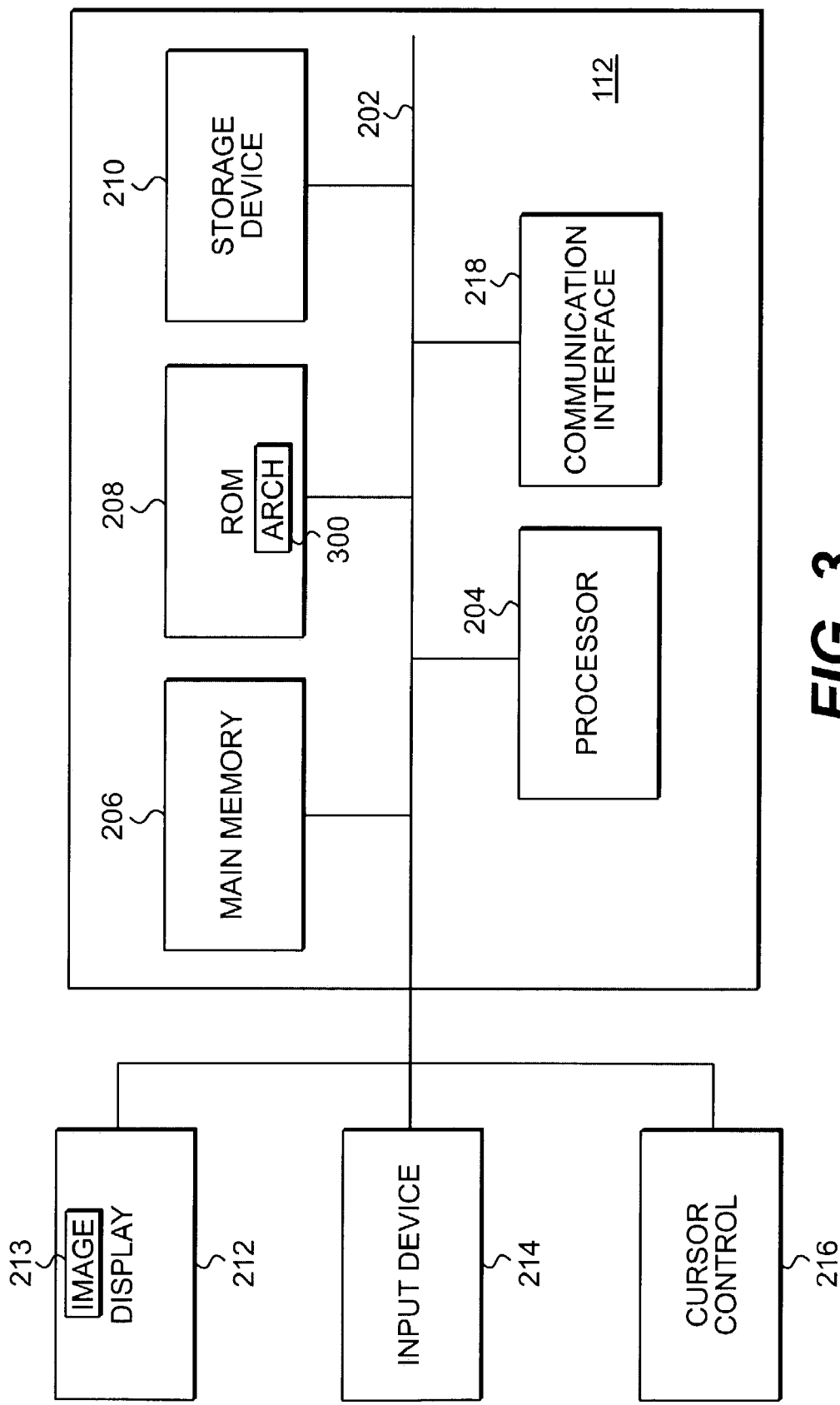
FIG. 3 is a block diagram of a computer system used with the network portion of FIG. 2A.

FIG. 3 is a block diagram illustrating an exemplary computer system, such as the computer system 112 shown in FIG. 2A, which is usable on the LAN 100. The computer system 112 may be any of personal computers, mini-mainframes, mainframes and the like. Although the computer system 112 is shown in FIG. 2A as a network device that is part of a wired local network, the computer system 112 may also be connected to the LAN 100 by a wireless link. In this regard, the computer system 112 is usable in mobile environments.

Returning to FIG. 3, the computer system 112 includes a bus 202 or other communication mechanism for communicating information, and a processor 204 coupled with the bus 202 for processing information. The computer system 112 also includes a main memory 206, such as a random access memory (RAM) or other dynamic storage device, coupled to the bus 202 for storing information and instructions to be executed by the processor 204. The main memory 206 also may be used for storing temporary variables or other intermediate information during execution of instructions by the processor 204. The computer system 112 further includes a read only memory (ROM) 208 or other static storage device coupled to the bus 202 for storing static information and instructions for the processor 204. A storage device 210, such as a magnetic disk or optical disk, is provided and coupled to the bus 202 for storing information and instructions.

As shown in FIG. 3, the ROM 208 includes a recovery architecture 300 that the processor 204 implements for real-time recovery of compromised information. Although the recovery architecture 300 is shown as stored in the ROM 208, the recovery architecture 300 could also be stored in other memory or storage devices of the computer system 112. The recovery architecture 300 will be described in more detail later.

The computer system 112 may be coupled using the bus 202 to a display 212, such as a cathode ray tube (CRT) or a flat panel display, for displaying information to a computer user. As will be described later, the display 212 may display a graphical image 213 that is used in conjunction with the recovery architecture 300 to "hide" certain minimal essential information that the recovery architecture 300 will use in the event of a real-time recovery of compromised information. The graphical image 213 may be stored in a storage or memory device of the computer system 112. An input device 214, including alphanumeric and other keys, is coupled to the bus 202 for communicating information and command selections to the processor 204. Another type of user input device is cursor control 216, such as a mouse, a trackball, or cursor direction keys for communicating direction information and command selections to processor 204 and for controlling cursor movement on the display 212.

The processor 204 can execute sequences of instructions contained in the main memory 206. Such instructions may be read into main memory 206 from another computer-readable medium, such as the storage device 210. However, the computer-readable medium is not limited to devices such as the storage device 210. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 206 causes the processor 204 to perform the process steps described below. In alternative embodiments, hard-wired circuitry may be used in place of or in combination with software instructions. Thus, the embodiments described herein are not limited to any specific combination of hardware circuitry and software.

The computer system 112 also includes a communication interface 218 coupled to the bus 202. The communication interface 218 provides two-way data communication. For example, the communication interface 218 may be an integrated services digital network (ISDN) card or a modem to provide a data communication connection to a corresponding type of telephone line. As another example, the communication interface 218 may be a local area network (LAN) card to provide a data communication connection to the LAN 100. In an embodiment, the communication interface 218 is wired to the LAN 100. Wireless links may also be implemented. In any such implementation, the communication interface 218 sends and receives electrical, electromagnetic or optical signals, which carry digital data streams representing various types of information. Communications through communication interface 218 may permit transmission or receipt of the intrusion detection, suppression and countermeasure agents for taking countermeasures against suspected or actual unauthorized users.

Although the recovery architecture 300 is shown installed on the computer system 112, the recovery architecture 300 may be stored on other network devices 101 of the LAN 100, including the security server 114.

As noted above, unauthorized users can gain access to information on the computer system 112 or any of the other network devices 101. Such access can compromise information on the computer system 112, and the other network devices 101, and may require an extensive recovery process if all the compromised information is to be recovered. For example, if the LAN 100, and in particular the radar system 120, is subjected to an information warfare (IW) attack, then restoration of the radar system 120, and the LAN 100 to full operational capability may involve shutdown of the radar system 120, and all, or part of other systems and components of the LAN 100, followed by restart of these systems. This shutdown and restart may be very time consuming. Intruders may be able to take advantage of the down-time associated with recovery by physically attacking assets associated with the LAN 100. This vulnerability may be avoided by preventing complete shutdown of the LAN 100, and by instituting real-time recovery of essential systems and components of the LAN 100.

To streamline the recovery process, a system in which only certain information need be recovered will be described. In this system, recovery depends on two concepts: minimal essential data, and data half-life. Minimal essential data is the smallest number or list of objects that can be used to span a system of those objects. The concept of minimal essential data is analogous to the concept of basis vectors in mathematics. A basis of a vector space V is a set of vectors $(v_1, v_2, v_3, \ldots v_n)$ that span V, and are linearly independent. Appropriate combination of the basis vectors defines all objects in the vector space V. In an analogous manner, data objects residing on the network devices 101 of the LAN 100 includes a subset of data objects that acts as the "basis vectors" for the LAN 100. Given this data object subset, all other data objects in the LAN 100 can be defined. This data object subset is defined as the minimal essential data object set, or minimal essential information (MEI), and represents the smallest set of data objects required to reconstitute the LAN 100 following an information warfare attack.

Figure 4B:
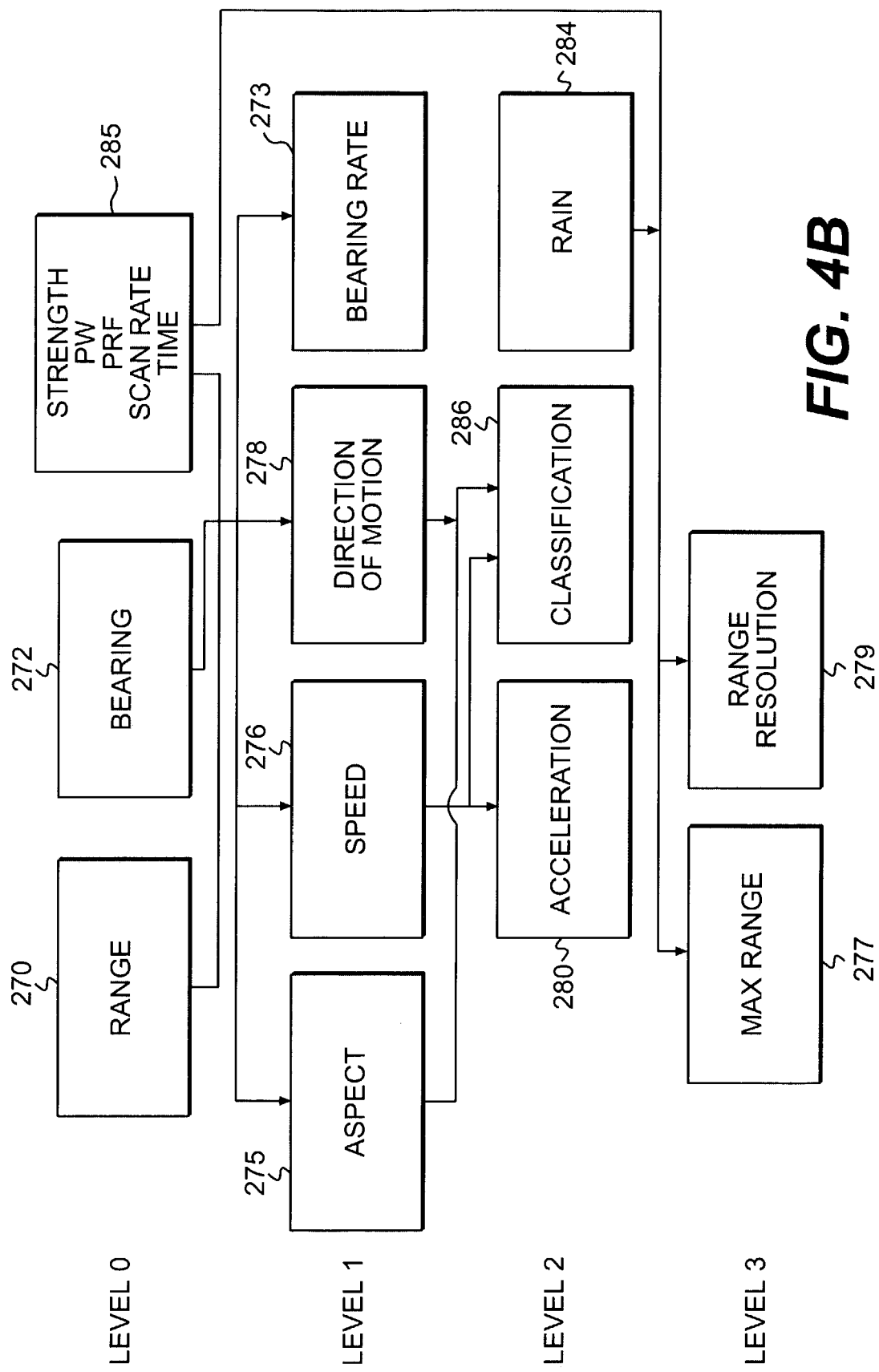

FIGS. 4A and 4B illustrate the concept of minimal essential information using the example of the radar system 120 of FIG. 2B. In the radar system 120, certain data objects are established at system initiation. Some of these data objects may be constants, some may be changed by the radar system 120 itself during operation, and some may vary from their initial values. For example, upon system initiation, the data object $\pi$ is established at 3.1415..., and remains fixed at this value, while other data objects such as pulse width (PW), pulse repetition frequency (PRF), and scan rate, for example, may be initially fixed, but can be varied during operation of the radar system 120. Other data objects are determined only during operation of the radar system 120. Examples of such data objects are range and bearing. Still other data objects are computed based on data objects determined at system initialization or during system operation, or both. Examples of such "computed" data objects are target position, speed, and bearing rate. Still other data objects may be provided for use by the radar system 120 by systems external to the radar system 120. An example of such a data object relates to weather, specifically rain (YES/NO; HEAVY/MODERATE/LIGHT), which can degrade radar performance. Using the data objects such as those shown in FIG. 4A, a processor in the LAN 100 can determine if a specific data object is considered minimal essential information, such that upon recovery of a system of compromised information, those data objects indicated as minimal essential information are recovered first. Such a processor may be implemented in the computer system 112 (see FIG. 3), the security server 114 (see FIG. 2A), or other network devices 101.

FIG. 4A shows examples of data objects associated with the radar system 120 of FIG. 2B, including application of the concept of minimal essential information. In FIG. 4A, nine such data objects associated with operation of the radar system 120 are displayed. However, the radar system 120 would comprise many additional data objects. The data objects include range 270, bearing 272, target position 274, speed 276, direction of motion 278, acceleration 280, π 282, rain 284, and classification 286. Also shown in FIG. 4A are parameters that may be associated with each of the data objects. In particular, a data object field 288 names the data object; a creation field 289 indicates if the data object is original data directly generated (measured) by the radar system 120, or is computed by the radar system or some system external to the radar system 120; a time of creation data field 290 indicates when the data object was created (system initiation, operation); an origin data field 291 indicates the source of the data object (self, external); a variable data field 292 indicates if the data object is constant or variable; a refresh rate data field 293 specifies a desired frequency for updating the data object; a value data field 294 assigns an initial value (which may be variable or constant) to the data objects; a threshold data field 295 assigns a threshold to the value data field 294 for selected data objects; and a minimal essential information data field 296 indicates if a data object is considered minimal essential information.

FIG. 4B shows selected data objects from FIG. 4A arranged in a hierarchical fashion. In FIG. 4B, the data objects are arranged according to how the data objects are created, i.e., measured directly in the radar system 120 (or other system) or the result of one or more computations executed in the radar system 120 (or other system). FIG. 4B shows four hierarchical levels 0-3. At level 0, the data objects target range 270 and target bearing 272 are measured by the radar system 120, and thus are identified as self-generated (entry 291) data objects that are created during operation (entry 289). Also shown at level 0 are measured, and variable data objects 285 associated with radar operation, including PW, PRF, scan rate, strength of return, and a time strobe, all of which are determined (created) at least at system initiation (entry 290). At level 1, the processor 126 makes a number of computations to generate additional data objects, including bearing rate 273, aspect 275, speed 276, and direction of motion 278, using the data objects from level 0. At level 2, the processor 126 makes additional computations to generate the data objects of classification 286 and acceleration 280. At level 2, the processor 126 is also shown receiving the data object rain 284 from a source external to the radar system 120. At level 3, the processor 126 uses selected data objects from levels 0-2 to generate data objects maximum unambiguous range 277 (which is a function of PRF, but which may be affected by rain); and range resolution 279 (which is a function of PW, but which may be affected by rain).

Returning to FIG. 4A, some data objects can be seen to have an exponentially decreasing value, or data half life. Data half-life refers to the fact that in the LAN 100, each data object has a temporal value that can be likened to an atomic half-life. In the environment represented by the LAN 100, data half-life means that over time, a data object looses its value. Specific data objects will have different half lives. At some point in this data value "decay," the data becomes invalid or obsolete. If a data object that has become invalid is used in a computation, the result may be mathematically accurate but operationally meaningless. For example, a position of a target $T_1$ at system time $t_1$ may not be useful for computations at system time $t_{100}$. A message stating that an attack has begun may be obsolete shortly after the message is promulgated. Some data objects, such as constants, for example, may always be valid and have value. For example, π (3.1415 . . . ) is valid at all times. Thus, each data object within the LAN 100 has a time window in which the data object is valid and has value. Of course, decay schemes other than exponential, including straight line decay, may be more appropriate for characterizing the decreasing value of a data object.

This concept of data decay leads to the following:

Individual data objects can be tagged to indicate real time of last computation. An example is "Target Position History," which carries a time tag that relates the target position to time of observation.

Data objects can be changed at a periodicity that depends on meeting certain conditions. As an example, "Target Classification" can change when certain conditions are met, such as changes in target characteristics. Software that analyzes whether a target is friend or foe executes at a periodic rate, but the value of a friend or foe flag could be set or reset during any of the periodic computations.

Data objects can be integrated over time. Such integration usually involves filtering (e.g., Kalman filtering) of the data object. As an example, a data object, "Current Target Position," uses a value of "Previous Target Position," filtered with a value of "Latest Target Position" provided to the LAN 100 from a primary sensor, such as that in the radar system 120.

Using the above-described concepts, recovery of compromised data involves two distinct phases: Analysis, in which appropriate data objects and their associated parameters are selected; and Execution, in which a network device 101 on the LAN 100 sequences and automates data recovery. The Execution phase can be further subdivided into a pre-IW attack stage, a recovery stage, and a post-IW attack reconstitution stage. These phases and stages will be described below in detail.

Figure 5A:
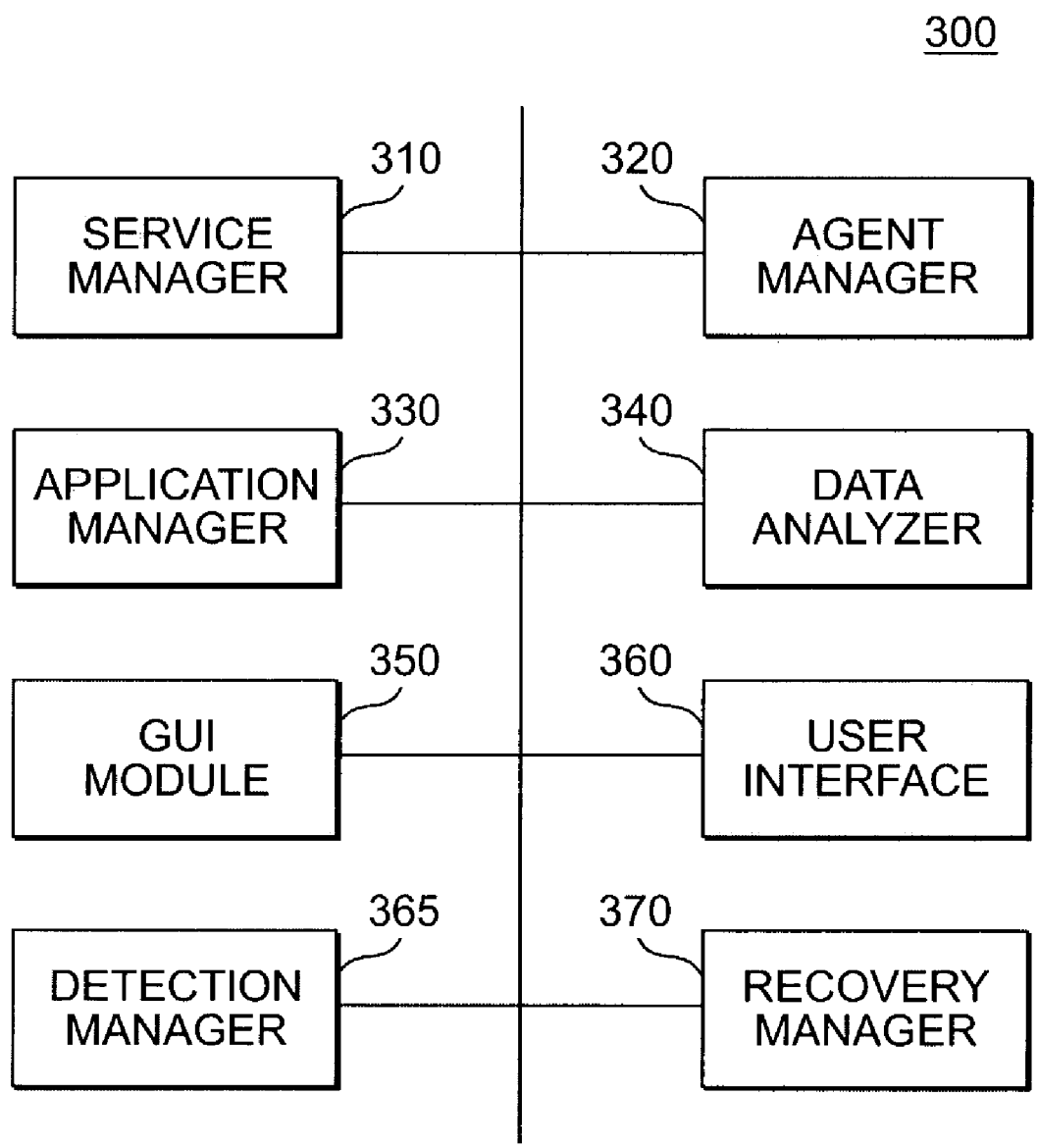
FIG. 5A is a block diagram of a program architecture, operable on a device of the network of FIG. 1, for recovery of compromised data.

FIG. 5A is a block diagram of the program architecture 300, operable on a network device 101 of the LAN 100, such as the computer system 112 or the security server 114, for executing the Analysis and Execution phases. The architecture 300 includes a service manager 310, an agent manager 320, an applications manager 330, a data analyzer 340, a graphical user interface (GUI) module 350, a user input manager 360, a detection manager 365, and a recovery manager 370. The recovery manager 370 will be described in detail with reference to FIGS. 5B-5D. The agent massager 320 determines which data objects exist on the LAN 100, and characterizes such data objects as to a time when the data objects are created. That is, the data objects may be initially declared (e.g., at compile time, and whether the data objects are declared at LAN 100 or network device start-up or during operation of the LAN 100 or network device). Alternatively, the data objects may be created as the result of multiple computations. The agent manager 320 examines each data object and assigns the data object a value depending on its mode of creation. In executing these functions, the agent manager controls a number of agents that operate within a node, or traverse from node to node in the LAN 100. Functionally, an agent is computer software, transportable over a computer network from one computer to another, to implement a desired function on the destination computer. An agent can also be defined as a transferable self-contained set of executable code instructions. From a code perspective, the preferred agents are collections of Java classes combined with a collection of persistent objects. The agents can be also written in many languages such as C++, C and assembler and other languages known to those of skill in the art.

The service manager 310 determines if a data object is a constant, and then tags such a data object as a constant. For all other data objects, the service manager 310 determines a refresh rate, and associates this refresh rate with the data object.

The applications manager 330 determines the application and process hierarchy-for use of the data objects. That is, system application software may have a hierarchy that is based on system mode. The hierarchy then defines how, and in what order, specific processes execute. The execution of specific processes may require specific data objects to be available to support computation of other data objects. For example, in the radar system 120, target speed is obtained by differentiating distance traveled by a target over time. To obtain distance traveled by the target, the target's range and bearing at least two points in time must be known. The distance traveled by the target is then the straight line subtending the arc between the two bearings, and the length of the straight line is a function of target range.

The data analyzer 340 identifies the minimal essential information for each system in the LAN 100, and for each mode of operation of the system in the LAN 100. For example, the radar system 120 may operate in a search mode or a track mode, and in these two modes, the minimal essential information may differ. To identify minimal essential information, the data analyzer 340 first applies a series of qualifiers to the list of available data objects. For example, in the radar system 120, one such qualifier may be the target classification as friend, foe, or unknown (unk). When the radar system 120 is operating to track hostile targets, only targets classified as foe may be important to reconstituting the system in the event of information compromise. Thus, a classification qualifier of "foe" may be applied to the universe of target objects in the radar system 120 to produce minimal essential information. A second qualifier may be time of last detection of the "foe" targets. Thus, a detection of a "foe" target may be considered minimal essential information if such a detection is the minimal sufficient to derive target motion data objects, for example.

The GUI module 350 controls a graphical user interface that is used to display information to a human operator. The user input manager 360 receives user inputs and directs those inputs to the data analyzer 340 for execution. Through the user input manager, a human operator can override decisions of the data analyzer 340 in characterizing a specific data object as minimal essential information. For example, when tracking hostile targets using the radar system 120, the data analyzer 340 may identify target classification as minimal essential information. However, a human operator may apply an additional qualifier of minimum target range as additional minimal essential information.

The detection manager 365 contains the software routines, data storage capacity, and processing means to detect an IW attack anywhere on the LAN 100. Copending applications, entitled "Steady State Computer Intrusion And Misuse Detection" and "System and Method for Real-Time Network-Based Recovery Following an Information Warfare Attack," assigned to the instant assignee, and filed on even date herewith, and incorporated herein by reference, describe mechanisms to detect computer misuse and intrusion. Detection may be based on a number of potential activities that are monitored by the detection manager 365. For example, insider misuse can be detected when an authorized user performs an unauthorized, or perhaps, infrequent operation that may raise the suspicion that the authorized user's computer is being misused. An unauthorized user could obtain the password of an authorized user, logon to the LAN 100 from the authorized computer user's computer, and attempt to perform operations not typically associated with the authorized user. In another example, user profile data may stored in an audit database and may be used to detect an intrusion. The user may have access to a particular database but has not accessed the database for over a year. A sudden access of the database may be inconsistent with the user profile, and may generate an alert that an intrusion or insider misuse is occurring. In yet another example, the software agents controlled by the agent manager 320 may not make reports back from a particular network device 101, indicating an IW attack is occurring at the network device 101. Still examples are an attempted login by a computer that does not have access to the LAN 100, attempted logons that tried to login three times but failed, excess system calls, too many root logins, and system memory changes.

An example of the execution of the architecture 300 as applied to an airborne radar system 120 shown in FIG. 2B follows. In this example the radar receiver 124 receives a return signal from an aircraft, and the radar system 120 enters an automatic tracking mode. The first return signal establishes the target's initial position (range and bearing). Subsequent returns, which may occur with a frequency based on the radar's "scan rate," establish second and subsequent target positions. Using the target positions, the processor 126 in the radar system 120 computes target speed, direction of motion, and acceleration (if applicable). The radar system 120, or a separate processor or other component (not shown) may also establish an initial classification, including whether the target is a threat/non-threat (i.e., friend or foe), and type of aircraft, for example. The radar system 120 may display certain of these target parameters to human operators, and may provide target information to other devices 101 in the LAN 100. Assuming the target is detected at times $t_1, t_2, t_3, t_4 \ldots t_n$, then data related to the target may be based on any or all of these target detections. Certain data, such as range and bearing, for example, are "original data" while other data, such as target speed and direction of motion, are "computed data." In terms of relevancy, "original data" associated with time $t_1$ is not likely to be as relevant as "original data" from $t_n$ (the most recent detection). With respect to computed data, particularly data such as direction of motion, for example, data from times $t_{n-2}, t_{n-1}$, and $t_n$ may be equally relevant in computing a straight line direction of motion, while data from times $t_1$-$t_4$ may be less relevant.

The determination of which data events are relevant, and consequently the determination of data half-life, may be automated through use of the architecture 300. For example, the data analyzer 340 may apply an exponentially decreasing function to values of data points more than three detection earlier than the most recent detection, when such data are used to compute direction of motion. Similarly, the data analyzer 340 may apply an exponentially decreasing function to all original data. Then, for any specified use, the data analyzer 340 may determine a half life value (e.g., the threshold 295, see FIG. 4A) below which a specific data object is no longer worth recovering. The determination of the half life threshold 295 may be based on time, or may be based on a number of observations.

Figure 5B:
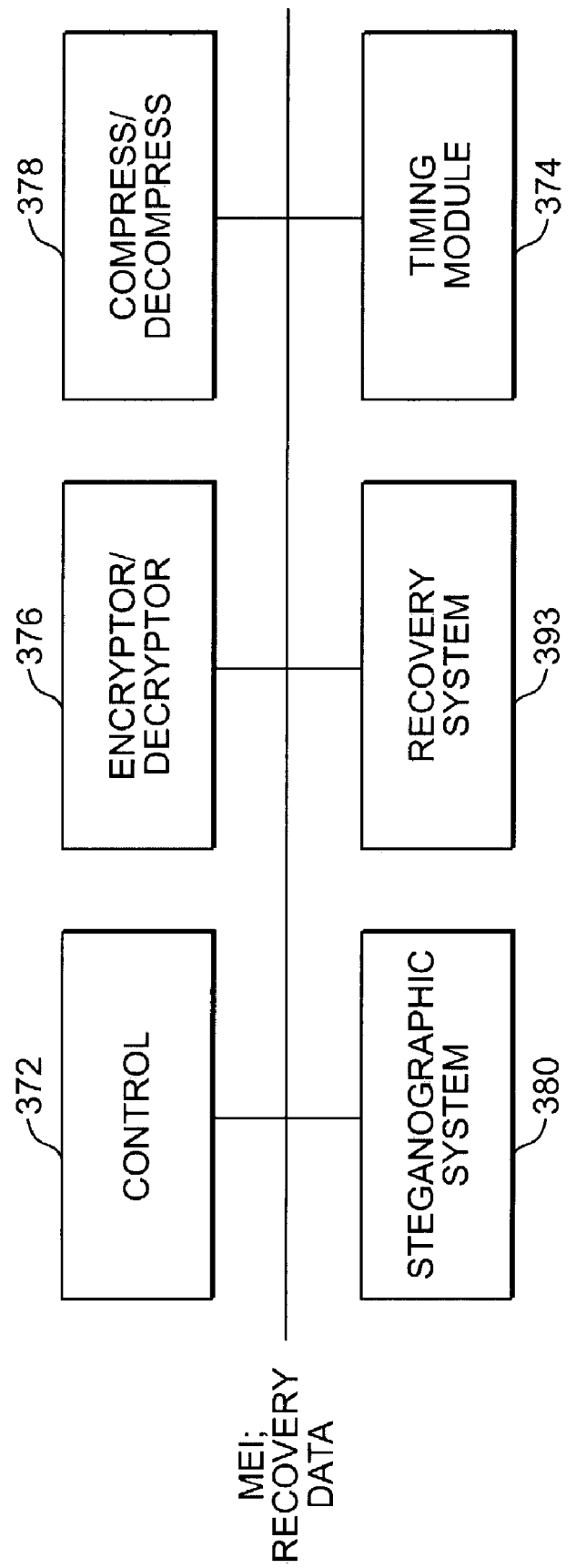
FIG. 5B is a block diagram of a recovery program to institute real-time recovery of a network experiencing an information warfare (IW) attack.
Figure 5C:
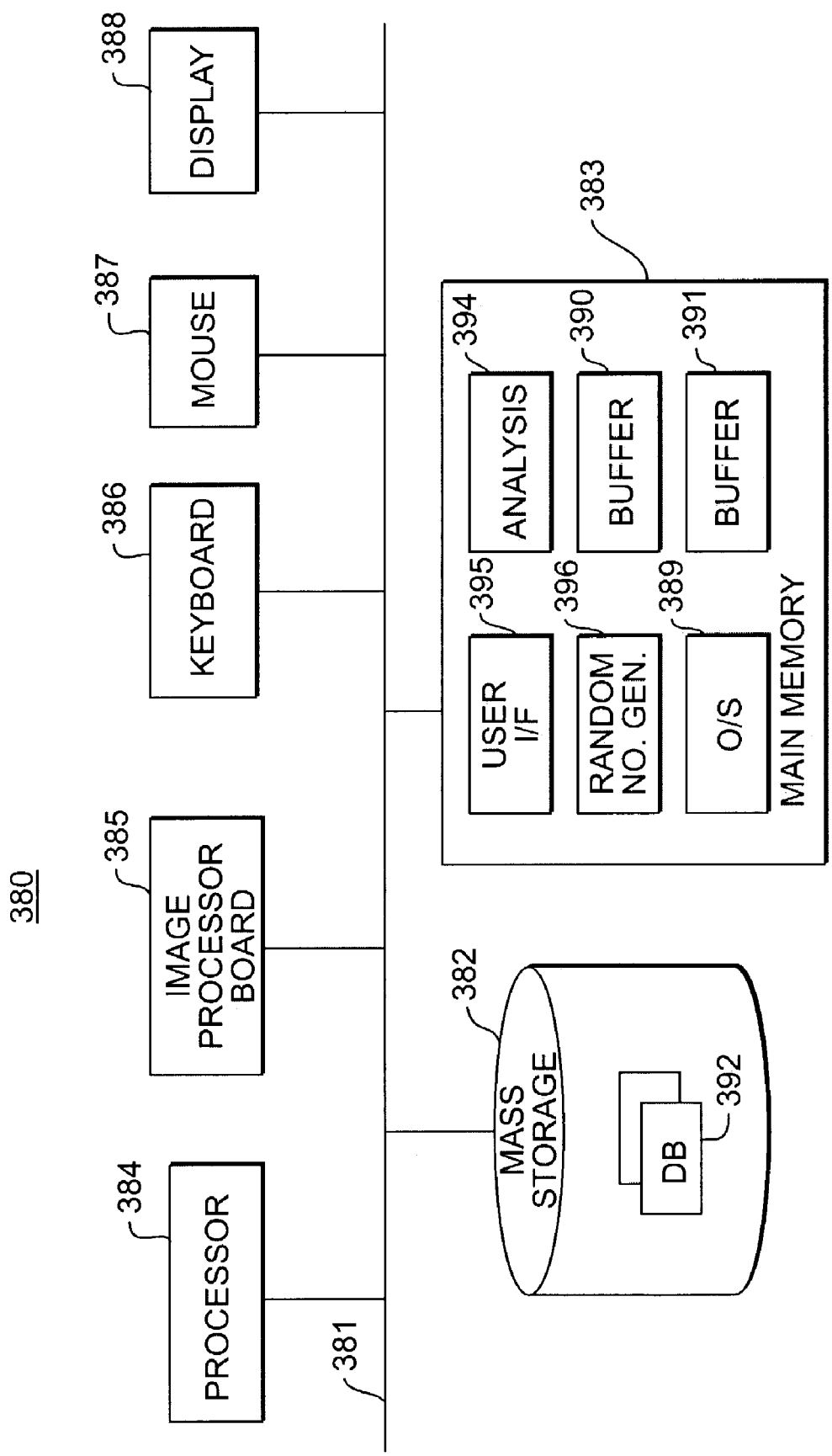
FIG. 5C is a block diagram of a steganographic system used with the recovery program of FIG. 5B.

FIG. 5B is a block diagram of the recovery manager 370. The recovery manager 370 receives the minimal essential information (MEI) and other recovery information. The recovery manager 370 includes a control module 372 that controls processing by components of the recovery manager 370, an encryptor/decryptor 376 that encrypts and decrypts the minimal essential information, a compressor/decompressor that compresses and decompresses the encrypted/decrypted minimal essential information; a timing module 374 that tracks certain time intervals for use in recovering the LAN 100 in the event of an IW attack; a steganographic system 380 that "hides" the minimal essential information, and a recovery system 393 that implements recovery routines in the LAN 100. The steganographic system 380 and the recovery system 393 will be described in detail with reference to FIGS. 5C and 5D, respectively, FIG. 5C is a block diagram of the steganographic system 380. The steganographic system 380 uses the well-know art of steganography to "hide" the minimal essential information on components of the LAN 100 so that the minimal essential information is less susceptible to a cyber attack.

Data hiding is a class of processes used to embed recoverable data in digitally represented information, such as a host image, with minimal degradation to the host information. In the context of the LAN 100, the goal of data hiding is to insulate the minimal essential information from an IW attack on other parts of the LAN 100.

After receiving the minimal essential information, the encoded image may undergo intentional and inadvertent modification due, for example, to channel noise, filtering, resampling, rotation, cropping, lossy compression, or digital-to-analog (or analog-to-digital) conversion. In order to be effective, the data hiding technique embeds the minimal essential information in a manner that allows determination of its presence or absence even after such modifications.

In an embodiment, the steganographic system 380 embeds one bit, or a pattern of bits, indicating the presence or absence of the minimal essential information, in a host image in a manner that allows detection of the bit, or pattern of bits, by exploiting the behavior of sums of a large number of random variables. Specifically, the data-embedding technique requires altering characteristic parameter values at a set of pseudo-randomly chosen locations in the host image in a manner that markedly changes the expectation value of some linear combination of mathematical functions of the values at that set of locations. The embedded minimal essential information is recoverable from an test image by calculating an experimental value of a linear combination of a large number of instances of the functions and comparing the experimental value with the expectation value of the sum for the unaltered host image. Many other data hiding techniques are available for embedding the minimal essential information in another digital data file. Such techniques are well known in the art, examples of which are taught in U.S. Pat. Nos. 6,314,192, 6,301,360, and 6,252,963, the disclosures of which are hereby incorporated by reference.

The embedding is done by first randomly selecting a large number of locations in the host image, for example by associating locations in the image with members of a series of pseudo-random numbers. In the general case, the locations are partitioned into first and second groups. The host image is then altered by increasing the values of the characteristic parameter at locations belonging to the first group and decreasing the values of the same parameter at locations belonging to the second group. For digitally encoded images, the locations correspond to groupings of adjacent pixels.

Decoding entails determining whether or not an test image includes the embedded pattern. To decode, the selection and partition of locations generated during the embedding process is recreated, for example, by supplying a key specific to the pattern to a pseudo-random number generator and then applying the partition procedure. The decoder then calculates an experimental value of a test statistic, formulated to reflect the alterations to the host image associated with the statistic, of the parameter values assessed at the selected locations in the image. Generally, the test statistic is equivalent to a linear combination of many instances of respective functions of the parameter values of locations belonging to the first and second groups. For example, since the parameter values of the first group locations are all increased and those of the second group all decreased, an appropriate function would be the difference between the sums of the parameter values over the first and second group locations. This calculation does not require the decoder to have the host image.

If the probability density functions of the parameter at all locations have finite expected value and variance and are identical and independent of the values assumed at other locations, then a test statistic equal to the sum of a large number of instances of a linear combination of the parameters assumes a Gaussian form. This property facilitates determining quantitatively whether the observed value of the test statistic indicates operation of the probability density function associated with the unaltered host image or of the shifted density associated with the embedded pattern. A Gaussian description may be appropriate even for statistics that do not conform to the restrictions just listed. Furthermore, even a non-Gaussian statistic can adequately differentiate between an unshifted and a shifted probability density function. The likelihood of an observed experimental value's belonging to a density of known expected value can be bounded using the Chebyshev inequality, for example.

The reliance of the decoding on the statistical properties of combinations of many numbers renders the embedded minimal essential information resistant to defeat by degradation of the image carrying the pattern. The express knowledge of the location selection and partition as well as of the specific alteration to the parameter values that is required to reverse the encoding makes the embedded bit resistant to intentional removal from the altered host image. Applying the changes to pixel groupings protects the embedded bit from obliteration by lossy compression, tone correction, filtering, cropping, and affine transformation.

In FIG. 5C, the steganographic system 380 is shown to include a system bus 381, over which all system components communicate, a mass storage device (such as a hard disk or optical storage unit) 382 and a main system memory 383.

A processor 384 controls operation of the steganographic system 380 and its components. To facilitate rapid execution of the image-processing operations, the steganograplic system 380 also contains an image-processing board 385.

In an embodiment, the steganographic system 380 is automated using the processor 384 to embed the minimal essential information in a host image on a network device 101 of the LAN 100. Alternately, a human operator can interact with the steganographic system 380 using a keyboard 386 and a position-sensing device (e.g., a mouse) 387. The output of either device can be used to designate information or select particular areas of a screen display 388 to direct functions to be performed by the steganographic system 380.

The main memory 383 contains a group of modules that control the operation of processor 384 and its interaction with the other hardware components. An operating system 389 directs the execution of low-level, basic system functions such as memory allocation, file management and operation of mass storage unit 382. At a higher level, an analysis module 394, implemented as a series of stored instructions, directs execution of the primary functions of the steganographic system 380. Instructions defining a user interface 395 allow straightforward interaction over the screen display 388. The user interface 395 generates words or graphical images on display 388 to prompt action by the user, and accepts user commands from the keyboard 386 and/or position-sensing device 387. A random number generator 396 creates the ordered series of pseudo-random numbers used in encoding or decoding.

The main memory 383 also includes one or more input image buffers 390 that contain image(s), such as a host image, used as input for processing by the processor 384 and output image buffers 391 that contain an output image generated by that processing. The contents of each input or output image buffer 390 and 391 define a raster, i.e., a regular two-dimensional pattern of discrete pixel positions that collectively represent an image and may be used to drive (e.g., by means of image-processing board 385) screen display 388 to display that image. The values of pixel parameters, such as luminance, contained at each memory location in the image buffers 390 or 391 directly governs the appearance of a corresponding pixel oil the display 388.

One or more databases 392 contain encoding and/or decoding information, e.g., the output of the random number generator 396, the key used by the random number generator 396 to generate the pseudo-random number series, the role governing assignment of pixels to groups, the description of groups, the test statistic formulation, and expected value or descriptions of geometric transformation. One or more of the databases 392 may be associated with each one of the image buffers 390 or 391 and contain information specific to the image contained in the associated buffer; or, one database 392 may contain information generic to all images encoded or decoded by the apparatus. The databases 392 may be stored in the mass storage device 382 in file(s) linked to file(s) containing the associated image(s).

Figure 5D:
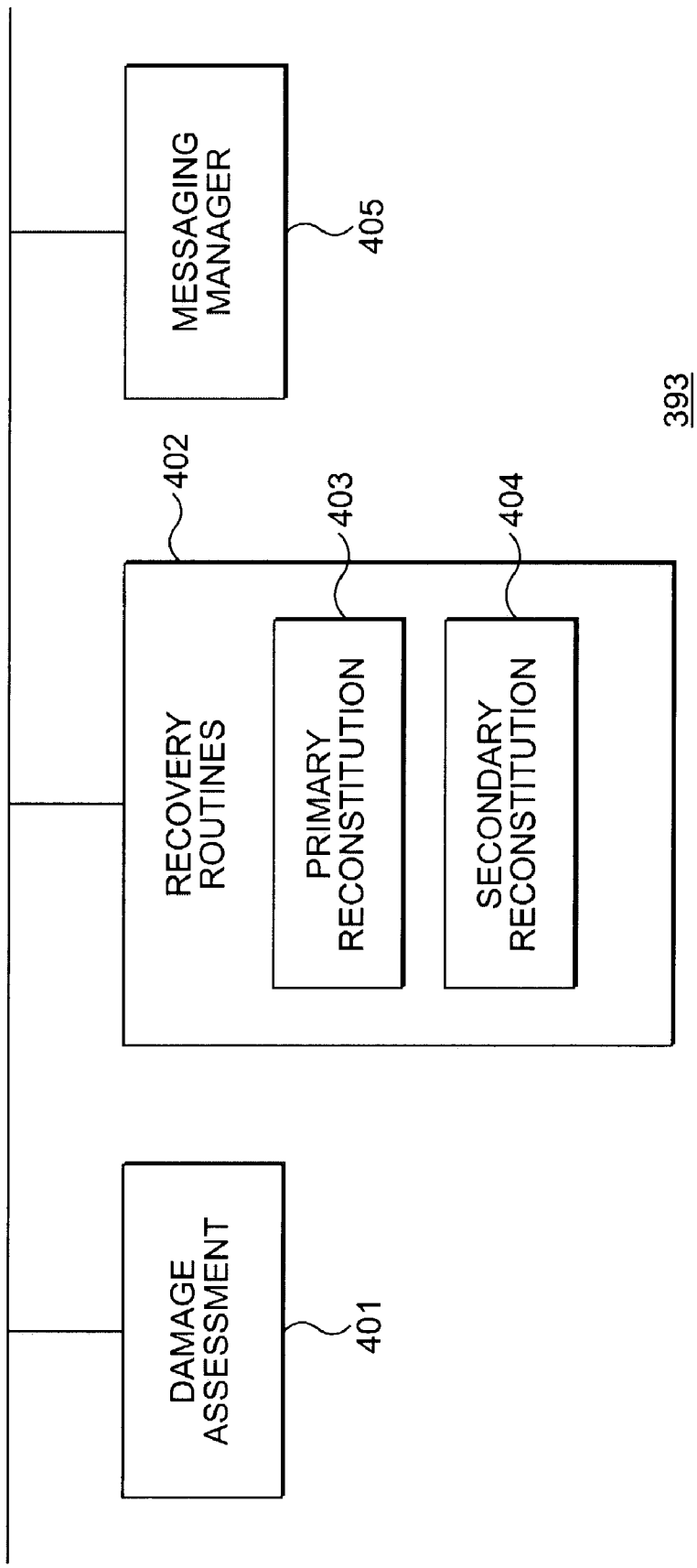
FIG. 5D is a block diagram of a component of the recovery program of FIG. 5B.

FIG. 5D is a block diagram of the recovery system 393. The recovery system 393 includes a damage assessment module 401, recovery routines 402, and a messaging manager 405. The recovery routines 402 include primary reconstitution routines 403 and secondary reconstitution routines 404. The recovery system 393 is preferably implemented as software operating on one or more network devices 101 of the LAN 100.

The damage assessment module 401 contains software routines to determine the extent of data corruption and other damage that may have occurred to the network devices 101. The messaging manager 405 provides the necessary messaging from the recovery system 393 to components of the LAN 100, such as the network devices 101. The primary reconstitution routines 403 provide the instructions required to perform the limited, "hot-start," or real-time recovery of the LAN 100 following an IW attack. The secondary reconstitution routines are the instructions needed to restore the LAN 100 to full operation following an IW attack.

One of ordinary skill in the art will understand that although the modules of the architecture 300 have been described separately, this is for clarity of presentation only. As long as the architecture 300 performs all necessary functions, it is immaterial how they are distributed within the LAN 100.

Figure 6:
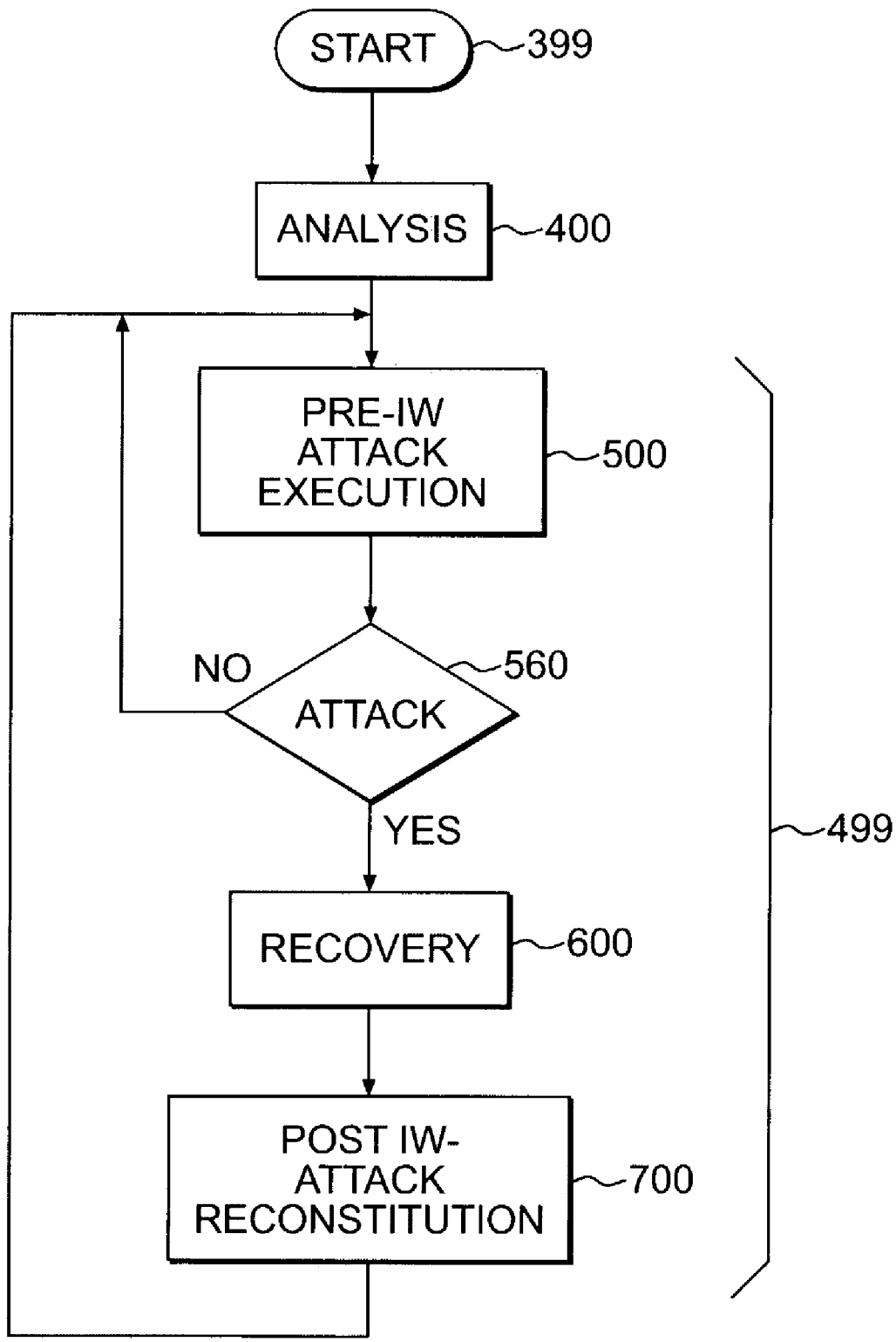
FIG. 6 is an overall flowchart of processes, executable on devices of the network of FIG. 1, for real-time recovery of compromised information.

FIG. 6 is a flowchart showing the major process steps in preparing for an IW attack, and for subsequent recovery. Following startup 399, the routines begin with Analysis routine 400, in which data objects are identified as necessary or desired for real-time recovery of compromised information in a computer network. Once the data objects are identified, the computer network can begin operations to prepare for and recover from an IW attack. The Execution routine 499 begins with pre-IW attack routine 500, in which the data objects identified in Analysis routine 400 are used to gather information needed for recovery from an IW attack. In block 560, the security sever 114 determines in the LAN 100 is subject to an 1W attack. If no, the Execution routine 499 returns to pre-IW attack routine 500. If yes, the Execution routine 499 moves to recovery routine 600. In recovery routine 600, minimal essential information created in routines 400 and 500 are used for a streamlined recovery of the LAN 100 and its network devices 101. Finally, in reconstitution routine 700, secondary recovery of the LAN 100 is completed. After secondary recovery is completed, the LAN 100 is in a normal operating mode and the Execution routine 499 returns to routine 500.

Figure 7A:
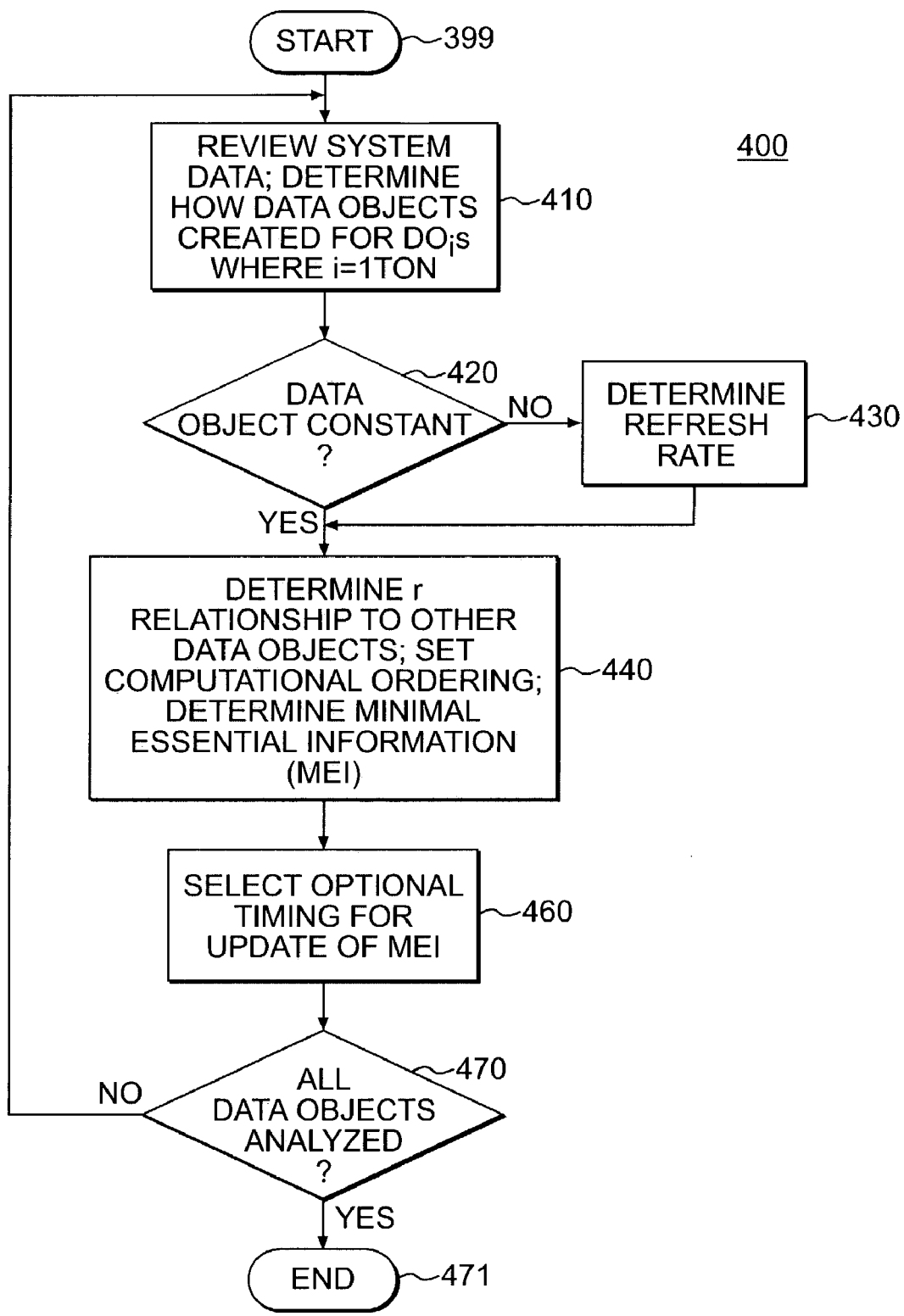
FIGS. 7A and 7B are flowcharts illustrating in more detail, the processes of FIG. 6, executable on devices of the network of FIG. 1, for selecting appropriate data recovery parameters to allow automatic recovery of compromised data.

FIG. 7A is a flowchart illustrating the Analysis routine 400, used with the LAN 100, for selecting appropriate data objects and their parameters to allow automatic recovery of compromised data. The Analysis routine 400 may be performed "off-line," and determines the minimal essential information, how the minimal essential information are accessed, and how the remaining data are derived in the LAN 100. The Analysis routine 400 also determines the computational characteristics of the minimal essential information. The Analysis routine 400 may be automated using a network device 101, such as the computer system 112, that is suitably programmed to provided the requisite analysis.

The Analysis routine 400 begins with the service manager 310 determining how system data are created (block 410). Next, the service manager 310 determines if the data are constant (block 420). If the data are constant, the Analysis routine 400 moves to block 440. If the data are not constant, the service manager 310 determines a refresh cycle for the data (block 430). The Analysis routine 400 then moves to block 440. In block 440, the data analyzer 340 determines what relationships exist between the data object and other data objects, and sets the computational ordering.

The data analyzer 340 then determines if the data object should be identified as minimal essential information. In block 460, the data analyzer 340 determines the optimal timing for updating the minimal essential information. In block 470, the service manager 310 determines if all data objects have been analyzed. If not all data objects have been analyzed, the Analysis routine 400 returns to block 410, and the next data object is analyzed. Otherwise the Analysis routine 400 ends, block 471.

Figure 7B:
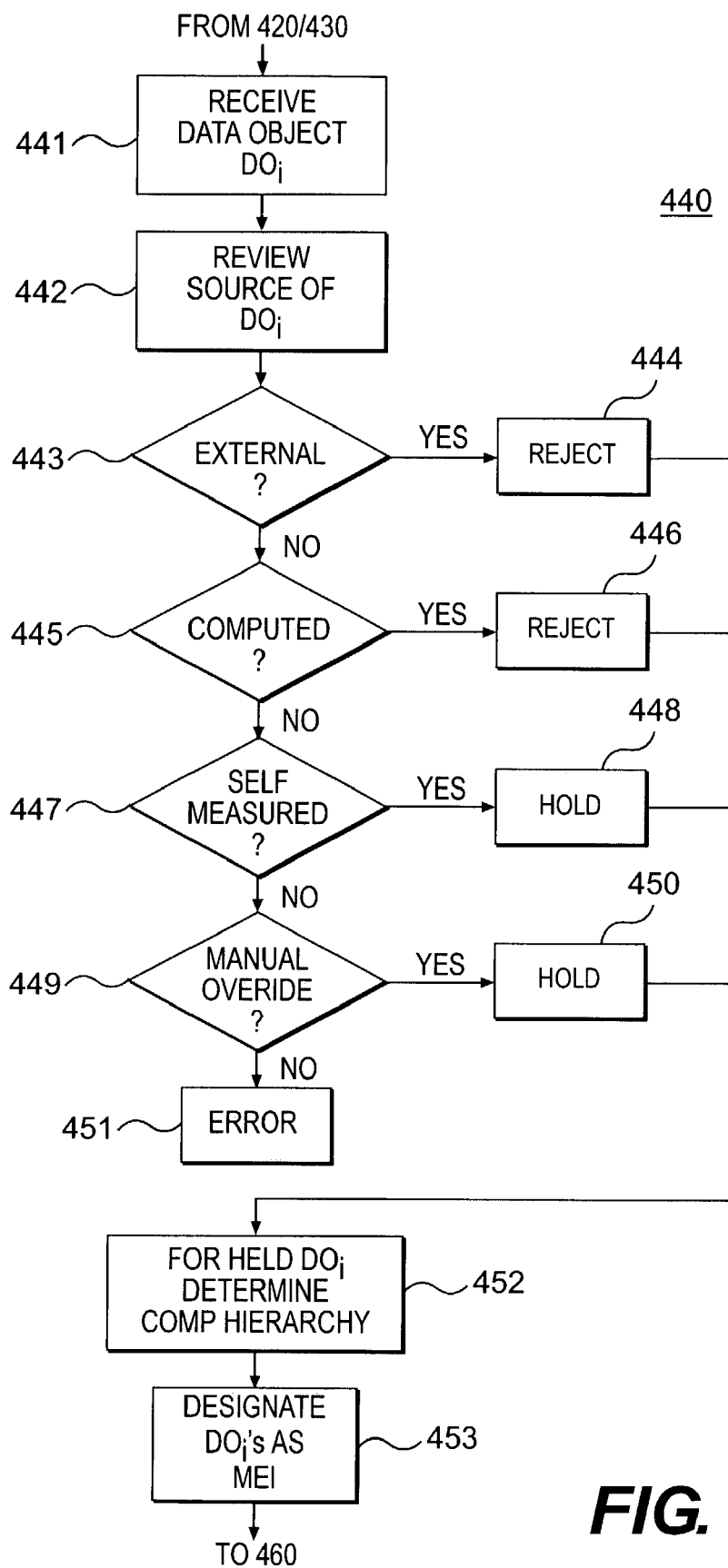

FIG. 7B is a flowchart illustrating routines for setting the computational ordering and determining the minimal essential information. In block 441, the data analyzer 340 receives data object $DO_i$ following completion of process blocks 420 or 430 (see FIG. 7A). In block 442, the data analyzer 340 reviews the data source of $DO_i$. Next, in blocks 443 449, the data analyzer 340 determines the origin and creation of $DO_i$ and either holds the data object in a buffer for eventual designation as minimal essential information, or rejects the data object. In particular, in block 443, the data analyzer 340 determines if $DO_i$ is from an external source. If so, $DO_i$ is rejected (block 444). If $DO_i$ is not from an external source, the data analyzer 340 determines if $DO_i$ was created through a computation, block 445. If so, $DO_i$ is rejected (block 446). In block 447, the data analyzer determines if $DO_i$ was created by the radar system 120 itself, and the creation was the result of initiation or operation of the radar system 120 itself. If so, $DO_i$ is held in a buffer, block 448. If $DO_i$ is not self-created, then in block 449, the data analyzer 340 determines if $DO_i$ is from a manual override. If so, $DO_i$ is held in a buffer, block 450. Otherwise, an error is declared, block 451. Next, in block 452, the data analyzer 340 determines the computational hierarchy for $DO_i$. Specifically, the data analyzer determines which computations rely on $DO_i$. Finally, in block 453, the data analyzer 340 designates $DO_i$ as minimal essential information. The routine 440 then moves to block 460.

Figure 8A:
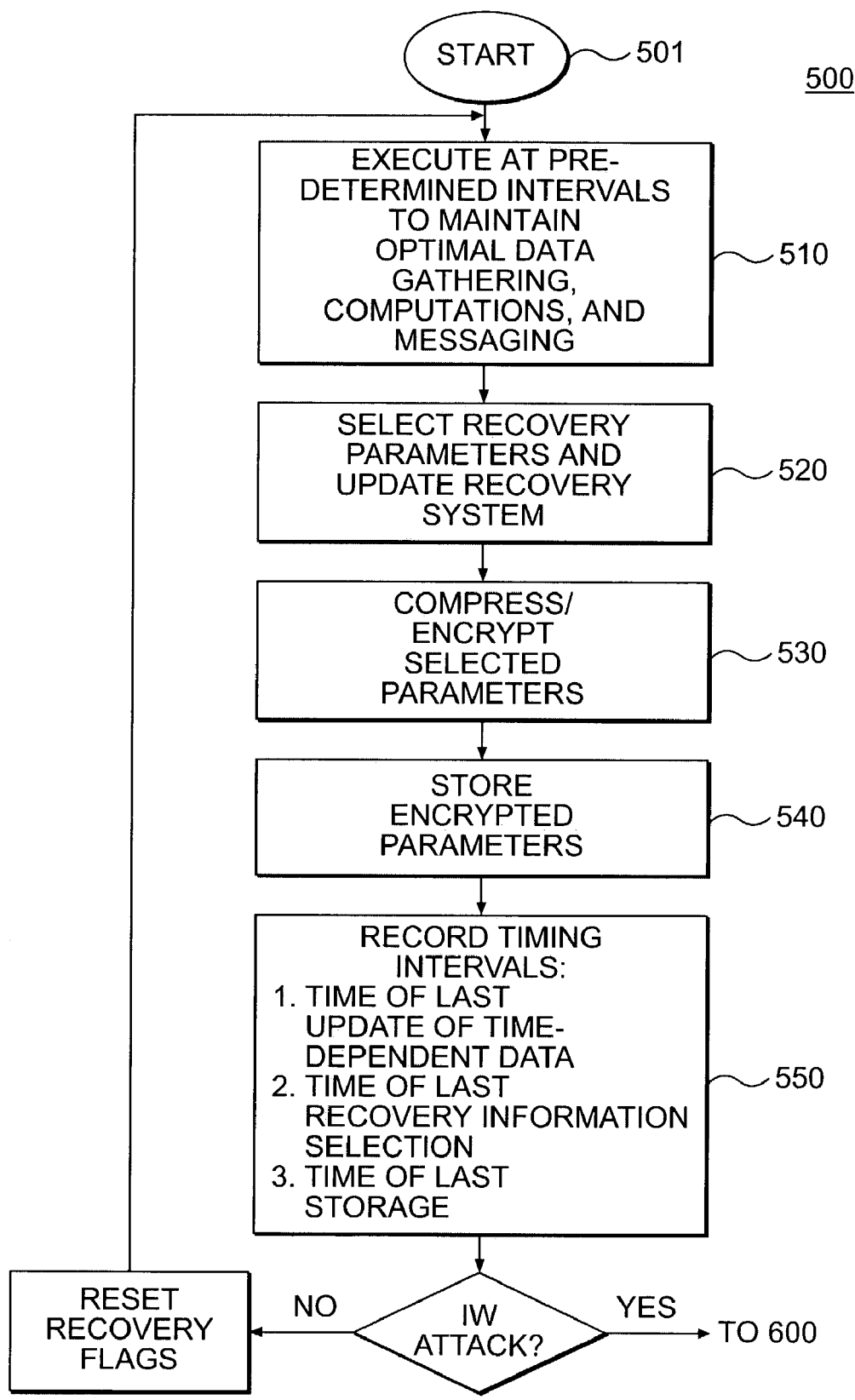
FIGS. 8A-8C are flowcharts illustrating in more detail, the processes of FIG. 6, executable on devices of the network of FIG. 1, for automatic, real-time recovery of compromised information.
Figure 8B:
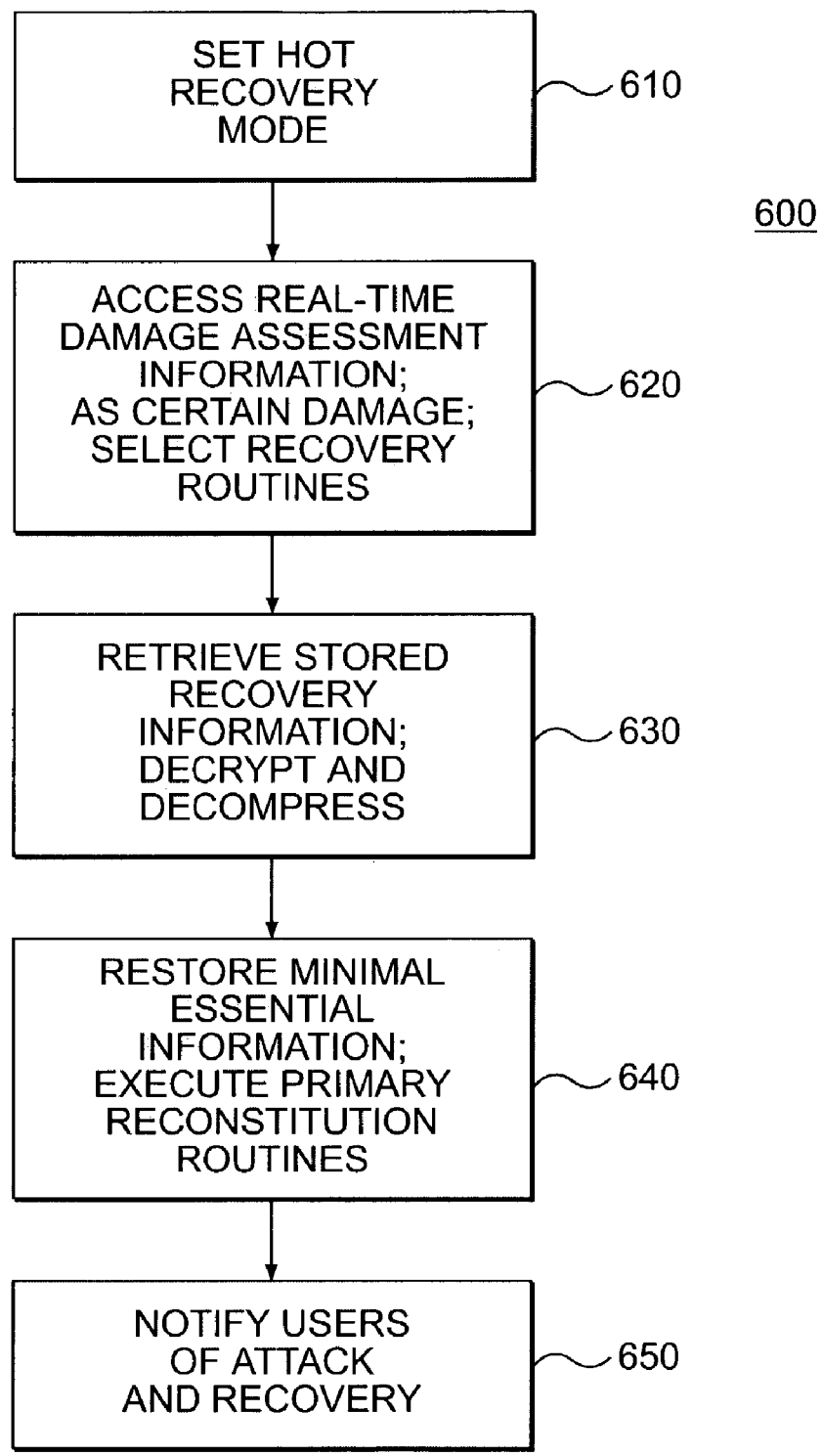
Figure 8C:
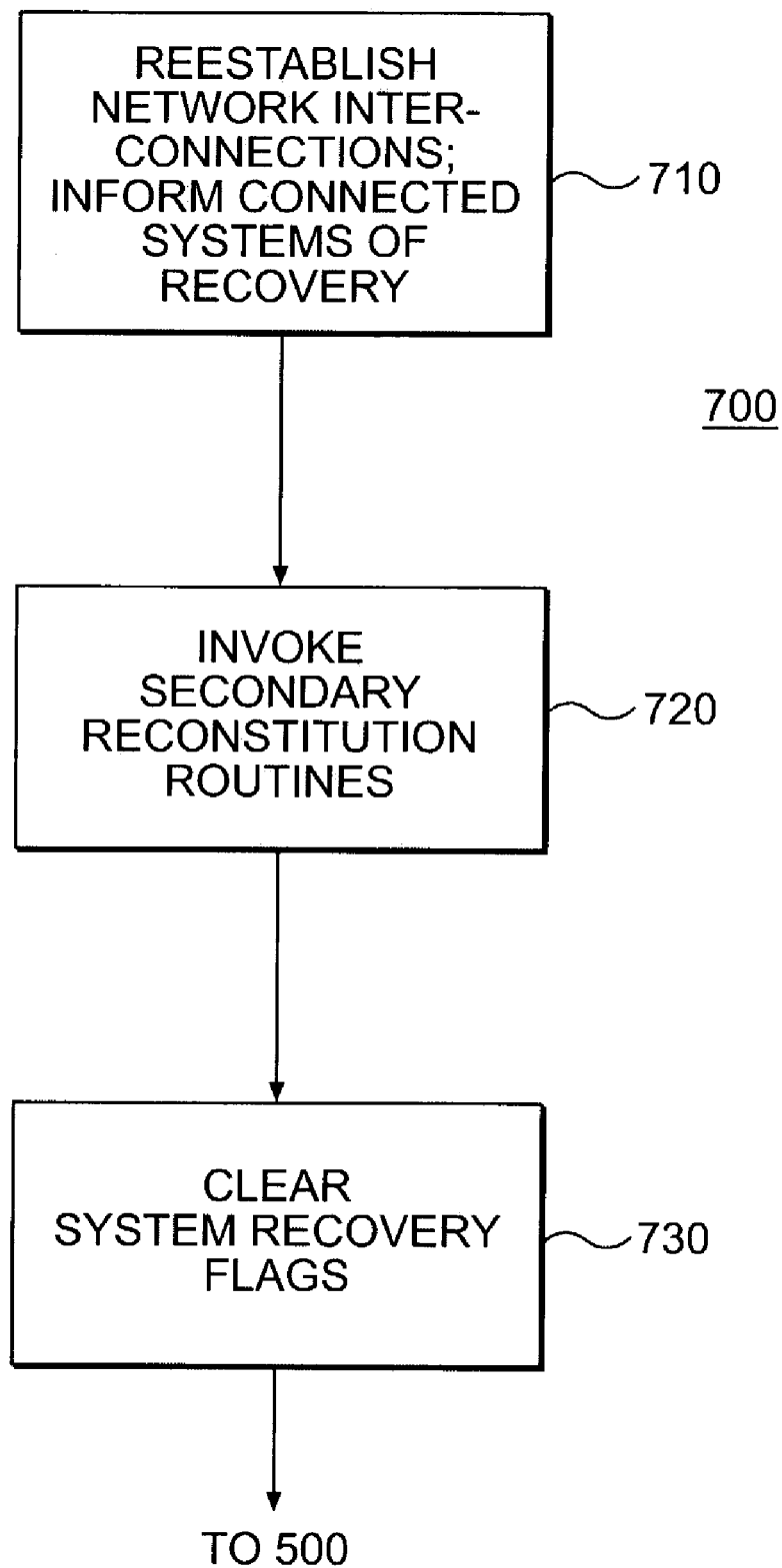

FIGS. 8A-8C are flowcharts illustrating a process, executable on a network device 101 the LAN 100 of FIG. 1, for automatic, real-time recovery of compromised information. FIG. 8A shows the routine 500 for pre-IW attack Execution phase operations. The routine 500 starts in block 501. In block 510, the recovery manager 370 executes processes at predetermined intervals to maintain optimal data gathering, computations and messaging. In block 520, the recovery manager 370 selects recovery parameters and updates components of the recovery manager 370. In block 530, the encryptor/decryptor 376 encrypts the minimal essential information designated by the data analyzer 340. The compressor/decompressor 378 then compresses the minimal essential information. The encrypted, compressed minimal essential information is the processed through the steganography system 380, and is hidden in host files (e.g., host images such as graphical images displayed on a computer screen) on the LAN 100 (block 540). Next, in block 550, the timing module 374 records time marks for specific events, including the time of last update of time-dependent data objects (e.g., target bearing); time of last hot recovery from an IW attack; and time of last storage of minimal essential information. Then, in block 560, the recovery manager 370 determines if a system on the LAN 100 is undergoing an IW attack. If the LAN 100 and its systems are free from an IW attack, the routine 500 moves to block 570 and the recovery manager 370 resets a recovery flag indicating that the routine 500 should continue to ensure that the latest values of the minimal essential information are available and hidden on the LAN 100. If the LAN 100 and its systems are experiencing an IW attack, the routine 500 ends and processing moves to recovery routine 600, shown in FIG. 8B.

FIG. 8B is a flowchart illustrating the recovery routine 600. The recovery routine 600 begins after a determination that the LAN 100, or network device 101, is being subjected to an IW attack (block 560 of FIG. 8A). In block 610, the recovery manager 370 sets necessary system parameters to initiate a "hot recovery" mode, which will eventually return the LAN 100 to normal operation. Next, in block 620, the recovery manager 370 accesses real-time damage assessment information, ascertains the extent of damage to the LAN 100, and selects appropriate recovery routines 402 (i.e., the primary reconstitution programs 403). In block 630, the recovery manager 370, using the steganographic system 380 and other systems, retrieves, decrypts, and decompresses the stored minimal essential information. In block 640, the recovery manager 370 restores the minimal essential information to the portions of the LAN 100 that were damaged by the IW attack, and executes the primary reconstitution programs 403. Finally, in block 650, the recovery manager 370 notifies LAN 100 users that the IW attack has occurred, and that hot recovery operations are complete. The recovery manager 370 then moves to post-IW attack operations.

FIG. 8C is a flowchart illustrating the post-IW attack reconstitution routine 700. In FIG. 8C, the recovery manager 370 establishes network interconnections in the LAN 100 as needed, and informs the connected systems of the recovery, block 710. In block 720, the recovery manager 370 invokes secondary reconstitution routines 404. In block 730, the recovery manager 370 clears all system recovery flags so that all recovery operations are complete, and normal operation of the LAN 100 can recommence. The process then returns to analysis routine 500.

Following is an example of the use of minimal essential information to recover compromised information. The example is based on data objects associated with tracking the target using the radar system 120 of FIG. 2B, and considering the data objects shown in FIG. 4A. A target position data object 274 is created during operation of the radar system 120, and hence the agent manager 320 codes (entry 290) the target position data object as "during operation." Because the target position data object 274 changes with time, the service manager 310 flags the data type as not constant, and assigns a refresh rate (entry 293) equal to the radar scan rate. Given two or more values of target position, the radar system 120, or a separate processor, can determine speed and direction of motion (i.e., velocity). Thus, the data analyzer 340 indicates the target's speed 276 and direction 278 as data objects related to the target position data object 274 (entry 289). Once velocity is known, the radar system 120 can compute acceleration when velocity changes, and an acceleration data object 280 is added as a related data object (entry 289). Given the data objects 270, 272, 276, etc., the data analyzer 340 determines that the minimal essential information for tracking the aircraft to be the last two target range and bearing values (entry 296).

We claim:

1. A computer system for real-time recovery of compromised information in a computer network, wherein the computer network includes one or more subnets, wherein the subnets comprise one or more nodes, and wherein the information compromise reduces operational capability of the computer network, the computer system, comprising:
   an agent manager that identifies data objects associated with one or more of the nodes; and
   a data analyzer that receives the identities of the data objects and determines which of the identified data objects comprise minimal essential information for real-time recovery of the compromised information, wherein the retrieved minimal essential information is used in a computational hierarchy to repopulate the data objects in the computer network, and wherein repopulation of the data objects restores operational capability of the computer network without shutdown of the computer network.

2. The system of claim 1, further comprising:
   a recovery manager that receives the minimal essential information;
   a steganographic system that hides the minimal essential information within the computer network and that, in an event of an attack on the computer network, retrieves the minimal essential information.

3. A computer-implemented method for real-time recovery of compromised information in a computer network, the computer network comprising one or more nodes, the method, comprising:
    analyzing data objects in the computer network to determine data objects that comprise minimal essential information;
    collecting the minimal essential information; and
    storing the minimal essential information, wherein the stored minimal essential information is hidden in the computer network, wherein the retrieved minimal essential information is used in a computational hierarchy to repopulate the data objects in the computer network, and wherein repopulation of the data objects restores operational capability of the computer network without shutdown of the computer network.

4. The method of claim 3, wherein the analyzing step, comprises:
    determining a data half-life for the data objects;
    determining a rate of updating the data objects;
    determining a computational ordering among the data objects; wherein the data objects comprising the minimal essential information are determined based on data half-lives, update rates, and computational ordering, and wherein a frequency of collecting the minimal essential information is based on update rates and half-lives of the data objects comprising the minimal essential information.

5. The method of claim 4, wherein the analyzing step further comprises rejecting as minimal essential information data objects generated as a result of the computational ordering.

6. The method of claim 4, wherein the analyzing step further comprises rejecting as minimal essential information data objects generated by a system outside the computer network.

7. The method of claim 3, wherein the minimal essential information is hidden in a digital file in the computer network.

8. The method of claim 7, wherein the digital file is a graphical image.

9. The method of claim 3, further comprising:
    monitoring the computer network for indication of an attack, wherein when the attack is detected:
        invoking a recovery mode;
        ascertaining the extent of damage to the computer network;
        selecting recovery routines; and
        notifying users of the computer network that an attack has occurred.

10. The method of claim 9, wherein invoking the recovery mode, comprises:
    retrieving the hidden, stored minimal essential information; and
    restoring the computer network by:
        loading the retrieved minimal essential information, and
        implementing the computational ordering to determine data objects computed for the data objects comprising the minimal essential information.

11. The method of claim 10, further comprising:
    re-establishing computer network connections; and
    invoking secondary recovery routines.

12. The method of claim 3, further comprising:
    encrypting the minimal essential information; and
    compressing the minimal essential information.

13. The method of claim 3, wherein the steps of analyzing, collecting, and storing are completed for each node in the computer network.

14. A computer-implemented method for recovering a computer network that might become subject to an information warfare attack, wherein the information warfare attack reduces operational capability of the computer network, the method, comprising:
    prior to the attack, determining minimal essential information to restore the operational capability of the computer network following the attack, comprising:
        determining a data half-life for data objects in the computer network,
        determining a rate of updating the data objects, and
        determining a computational ordering among the data objects, wherein the minimal essential information is based on the computational ordering;
    prior to the attack, collecting the minimal essential information;
    prior to the attack, hiding the minimal essential information in the computer network to lessen susceptibility of the minimal essential information to the attack; and
    subsequent to the attack:
        invoking a recovery mode of operation;
        retrieving the hidden minimal essential information, and
        reestablishing operation of the computer network using the retrieved minimal essential information.

15. The method of claim 14, wherein determining the minimal essential information further comprises rejecting as minimal essential information data objects generated from a computation and data objects provided by a source external to the computer network.

16. The method of claim 14, wherein the step of reestablishing comprises computing the data objects using the minimal essential information and the computational ordering to compute specific data objects.

17. The method of claim 16, wherein the step of reestablishing further comprises ascertaining damage to the computer network from the attack.

18. The method of claim 14, wherein a frequency of collecting the minimal essential information is based on the data half-lives and the update rates.

19. A computer system for recovery of a computer network subject to an information warfare attack, wherein the information warfare attack reduces operational capability of the computer network, the computer system, comprising:
    an agent manager that identifies data objects existing on the computer network;
    a service manager that determines data objects that are constants;
    an application manager that determines a hierarchy of modes of operation of the computer network;
    a data analyzer that determines minimal essential information for restoration of the operational capability of the computer network based on the identified data objects and on the hierarchy of modes of operation of the computer network; and
    a recovery manager that collects and stores the minimal essential information, and that uses the minimal essential information to restore the operational capability of the computer network subsequent to the information warfare attack.

* * * * *